United States Patent
Choudhury et al.

(10) Patent No.: US 10,666,359 B2
(45) Date of Patent: *May 26, 2020

(54) MULTI-LAYER SYSTEM SELF-OPTIMIZATION

(71) Applicant: AT&T Intellectual Property I, L.P., Atlanta, GA (US)

(72) Inventors: Gagan Choudhury, Jackson, NJ (US); Kathleen Meier-Hellstern, Cranbury, NJ (US); Alvin Goddard, Kendall Park, NJ (US); Narayan Padi, Cedar Knolls, NJ (US); Simon Tse, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,224

(22) Filed: Apr. 16, 2019

(65) Prior Publication Data

US 2020/0007237 A1 Jan. 2, 2020

Related U.S. Application Data

(63) Continuation of application No. 16/022,267, filed on Jun. 28, 2018, now Pat. No. 10,298,329.

(51) Int. Cl.
*H04B 10/27* (2013.01)
*H04J 14/02* (2006.01)
*H04Q 11/00* (2006.01)

(52) U.S. Cl.
CPC ............ *H04B 10/27* (2013.01); *H04J 14/021* (2013.01); *H04J 14/0227* (2013.01); *H04Q 11/0062* (2013.01); *H04Q 2011/0086* (2013.01)

(58) Field of Classification Search
CPC .... H04B 10/27; H04J 14/021; H04J 14/0227; H04Q 11/0062; H04Q 2011/0086
USPC .......................................................... 398/83
See application file for complete search history.

(56) References Cited

U.S. PATENT DOCUMENTS

| 8,346,078 B2* | 1/2013 | Kusama ............... H04B 10/572 398/25 |
| 2003/0099014 A1 | 5/2003 | Egner et al. |
| 2015/0131675 A1* | 5/2015 | Chen ..................... H04L 45/507 370/450 |
| 2015/0131997 A1 | 5/2015 | Syed et al. |

(Continued)

FOREIGN PATENT DOCUMENTS

| WO | WO 2017/211385 A1 | 12/2017 |
| WO | WO 2018/024809 A1 | 2/2018 |

OTHER PUBLICATIONS

Rozic et al.; "A Framework for Dynamic Multi-layer Resource Allocation and Optimization in Application-Centric Networking"; Optical Fiber Communications Conf. and Exhibition; 2017; 3 pages.

(Continued)

*Primary Examiner* — Dalzid E Singh
(74) *Attorney, Agent, or Firm* — BakerHostetler

(57) ABSTRACT

A software-defined network multi-layer controller (SDN-MLC) may communicate with multiple layers of a telecommunication network. The SDN-MLC may have an optimization algorithm that helps manage, in near real-time, the multiple layers of the telecommunication network.

20 Claims, 7 Drawing Sheets

(56) References Cited

U.S. PATENT DOCUMENTS

| | | | |
|---|---|---|---|
| 2016/0191194 A1* | 6/2016 | Wood | H04J 14/0286 |
| | | | 398/58 |
| 2017/0047999 A1 | 2/2017 | Wei et al. | |
| 2017/0230267 A1 | 8/2017 | Armolavicius et al. | |
| 2017/0290049 A1 | 10/2017 | Reisslein et al. | |
| 2017/0331703 A1 | 11/2017 | Sui | |
| 2018/0006928 A1 | 1/2018 | Luo et al. | |
| 2018/0053090 A1 | 2/2018 | Voelker et al. | |
| 2018/0077006 A1 | 3/2018 | Cui et al. | |
| 2018/0220210 A1* | 8/2018 | Paraschis | H04Q 11/0066 |
| 2018/0302152 A1* | 10/2018 | Shikhmanter | H04L 12/6418 |

OTHER PUBLICATIONS

Zhao et al.; "Dynamic optical resource allocation for mobile core networks with software defined elastic optical networking"; Optics Express; vol. 24 No. 15; Jul. 2016; p. 16659-16673.

Zhang et al.; "Evolving Traffic Grooming in Multi-Layer Flexible-Grid Optical Networks With Software-Defined Elasticity"; Journal of Lightwave Technology; vol. 32 No. 16; Aug. 2014; p. 2905-2914.

Rodrigues et al.; "Traffic Optimization in Multi-Layered WANs using SDN"; IEEE $22^{nd}$ Annual Symposium—High-Performance Interconnects; 2014; 9 pages.

* cited by examiner

US 10,666,359 B2

MULTI-LAYER SYSTEM SELF-OPTIMIZATION

CROSS REFERENCE TO RELATED APPLICATIONS

This application is a continuation of, and claims priority to, U.S. patent application Ser. No. 16/022,267, filed Jun. 28, 2018, entitled "MULTI-LAYER SYSTEM SELF-OPTIMIZATION," the entire contents of which are hereby incorporated herein by reference.

BACKGROUND

A packet layer of the network may include internet protocol (IP) links connected among IP devices such as router ports. The IP links may be routed over a path in the optical layer using reconfigurable optical add-drop multiplexers (ROADMs) at the endpoints and along the path, transponders at the endpoints, and optical signal regenerators (or repeaters) in the middle of the path when the path is too long. IP ports, optical transponders, and optical regenerators are typically associated with a certain bandwidth unit such as 40 Gbps, 100 Gbps, 200 Gbps, or 400 Gbps. If there are N traffic endpoints and K Quality of Service (QoS) classes then the traffic matrix consists of K*N*(N−1) individual traffic units, all of which may change over time and routed over the packet optical network. This disclosure is directed to addressing self-optimization in an existing network with regard to different layers of the network.

SUMMARY

Disclosed herein are techniques that may address repeated joint global optimization (e.g., whenever network condition changes) while running a multi-layer network. These network condition changes may be based on scheduled outages (e.g., maintenance activity such as software upgrades) or unscheduled outages (e.g., caused by fiber cuts or failure of IP or optical devices) or unplanned traffic changes. A software-defined network multi-layer controller (SDN-MLC) may communicate with multiple layers of a telecommunication network. The SDN-MLC may have an optimization algorithm that helps manage, in near real-time, the multiple layers of the telecommunication network.

In an example, an apparatus (e.g., software-defined network controller) may include a processor and a memory coupled with the processor that effectuates operations. The operations may include obtaining information associated with multiple layers of a telecommunications network, the information comprising optical layer information, router layer information, and traffic routing information; based on the information, determining to change a configuration of a component of the optical layer or the router layer; and based on the determination to change the configuration of the component of the optical layer or the router layer, providing instructions to effectuate the change. The information should be from multiple layers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventional approaches may assume that the mapping between an IP link and the set of optical transponders and regenerators needed underneath is fixed and if any component fails, the entire IP link fails and the non-failed components of the IP link are rendered unusable. Also, conventional approaches may assume consideration of traffic routing over the IP layer and the optical layer separately. Conventionally, optical layer optimization (e.g., the choice of IP links and their mapping over the optical layer) may rarely be done (e.g., once) and when optical layer optimization is done it is usually with a consideration that the IP layer traffic should only be routed over these once-determined set of IP links.

Disclosed herein are techniques that may address repeated joint global optimization (whenever network condition changes) while running a multi-layer network. These network condition changes may be based on scheduled outages (e.g., maintenance activity such as software upgrades), unscheduled outages (e.g., caused by fiber cuts or failure of IP or optical devices), or planned or unplanned traffic changes (e.g., spike in traffic to an internet resource because of an emergency or website promotion).

Figure 1A:
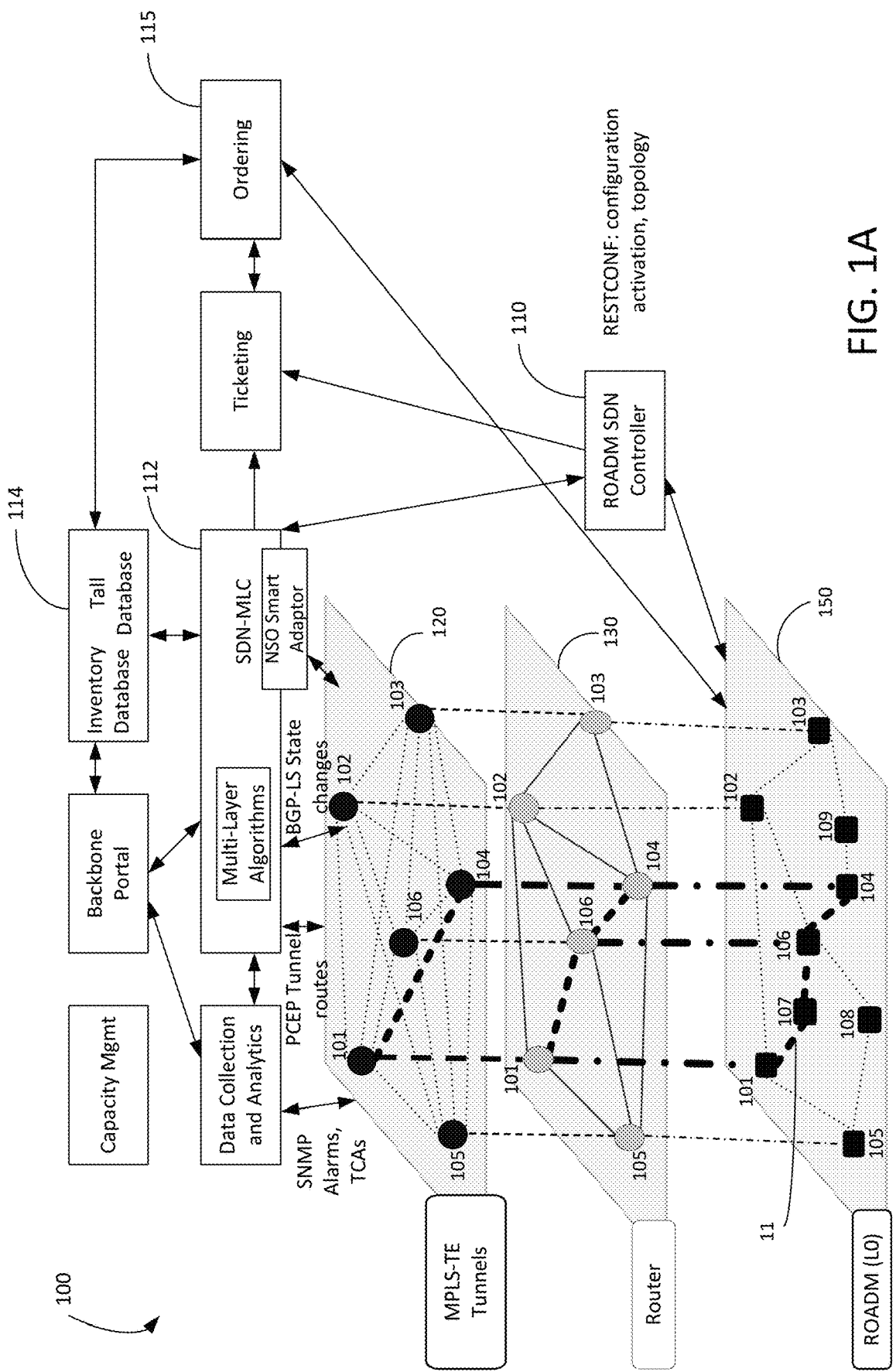
FIG. 1A illustrates an exemplary system for managing multi-layer self-optimization.

FIG. 1A illustrates an exemplary system for near real-time self-optimization. Software-defined network multi-layer controller 112 (SDN-MLC 112) may communicate with multiple layers of system 100 (e.g., a telecommunication network). SDN-MLC 112 may have an optimization algorithm that helps manage, in near real-time, the multiple layers of the network. The multiple layers may include optical layer 150, router layer 130 (which may also be a switch layer), and multi-protocol label switching (MPLS) tunneling layer 120. In another example, layers may include other layers as characterized by the Open Systems Interconnection model or the like. As generally shown in FIG. 1A (and with more detail in FIG. 1B), there may be multiple sites, which include one or more components that help build one or more physical or logical connections. For example, in FIG. 1B, for site 101 it may include router 131, tail 161, ROADM 151, or regenerator 171 of FIG. 1B). FIG. 1A illustrates connections between multiple sites as may be seen at each level. Sites include site 101 through site 109. Some sites (e.g., site 107) may have optical equipment (ROADM 157), but may not have routing equipment.

Figure 1B:
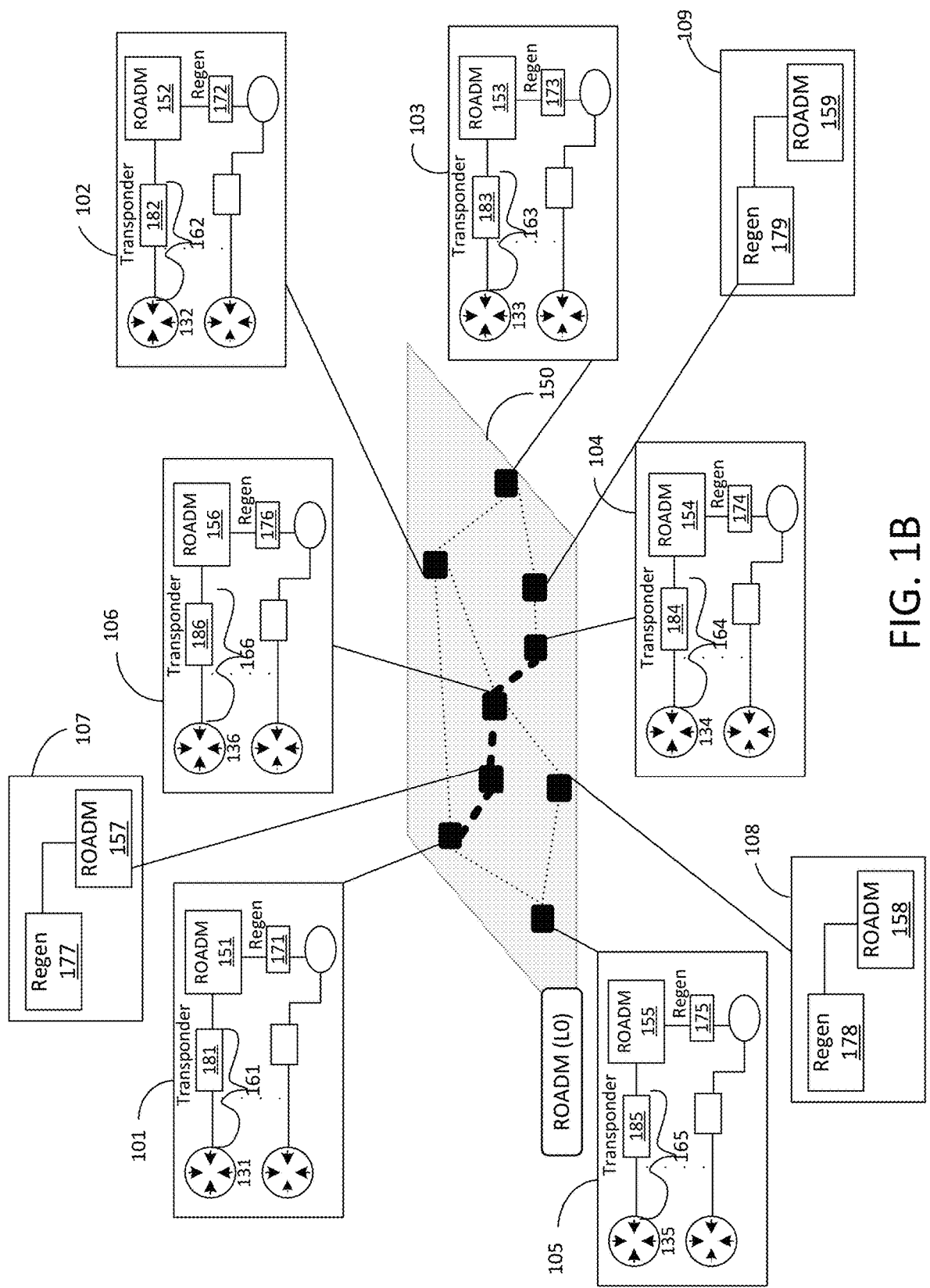
FIG. 1B illustrates FIG. 1A in further detail.

FIG. 1B illustrates FIG. 1A in further detail. Optical layer 150 may include multiple components, which are optional based on circumstance, such as reconfigurable optical add-drop multiplexer (ROADMs) (e.g., ROADM 151-ROADM 159), tails (e.g., tail 161-tail 166), and regenerators (e.g., regenerator 171-regenerator 178). A ROADM is a form of optical add-drop multiplexer that adds the ability to remotely switch traffic from a wavelength-division multiplexing (WDM) system at the wavelength layer. A tail is a connection between an internet protocol (IP) port (e.g., port of router 131) and a transponder port (e.g., port of transponder 181) that is connected to a ROADM port (e.g., 151). In optical fiber communications, a transponder may be the element that sends and receives the optical signal from a fiber. A transponder is typically characterized by its data rate and the maximum distance the signal can travel. An optical communications regenerator may be used in a fiber-optic communications system to regenerate an optical signal. Such regenerators may be used to extend the reach of optical communications links by overcoming loss due to attenuation of the optical fiber. Some regenerators may also correct for distortion of the optical signal by converting it to an electrical signal, processing that electrical signal, and then retransmitting an optical signal. Router layer 130 may include routers (e.g., router 131-router 136) or switches (not shown). MPLS layer 120 may have several tunnels logically connected via the routers in router layer 130.

Figure 2:
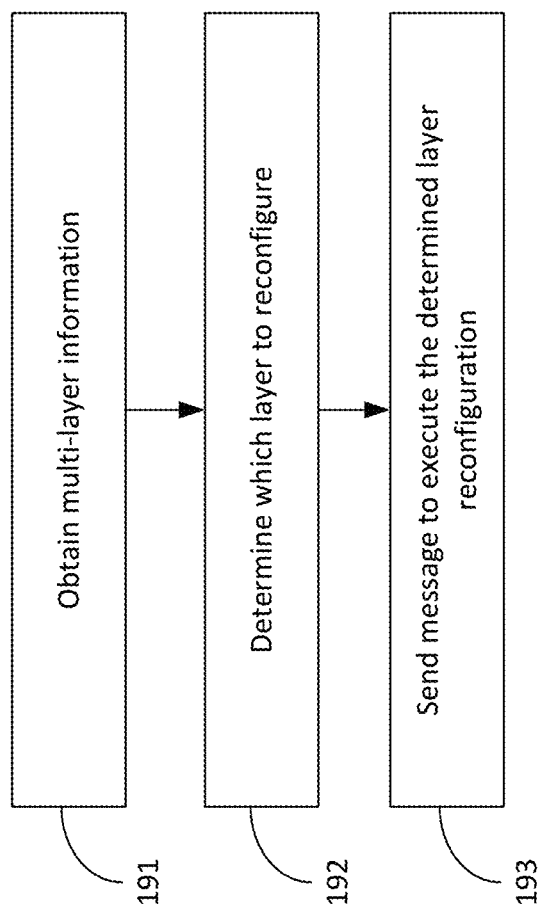
FIG. 2 illustrates an exemplary method for managing multi-layer system self-optimization.

FIG. 2 illustrates an exemplary method for near real-time self-optimization. In an exemplary scenario, as shown in FIG. 1A and FIG. 1B, there may be a system 100 with an optical layer 150, router layer 130, and a MPLS layer 120. At step 191, information about each layer may be obtained, which may be over seconds, minutes, days, weeks, months, or more. The information may be obtained in near real-time. The data may be stored or summarized to reflect seconds, minutes, or hours. This information may be before, during, or subsequent to an outage or other event of system 100 and may be used for forecasting. The information may assist in understanding activity patterns for system 100. For example, activity patterns may include the frequency of network link outages (and flow of traffic activity thereafter), dates and times of significant traffic load on system 100, minimum or maximum average (or median) traffic load on system 100 during a period, or estimated time of repair on a layer (which may be based on similar errors, alarms, or diagnosed issues), among other things. Information may be gathered on each layer. For MPLS layer 120, the information may include the MPLS interface state, reserved bandwidth, consumed bandwidth, or label switching paths, among other things. For router layer 130, there may be information that includes input bytes, output bytes, input packets, output packets, input errors, input drops, input framing errors, output errors, output drops, usual traffic load on affected link, types of traffic on affected link (e.g., defined QoS, video, voice, TCP, UDP, source address, etc.), or routing information, among other things. The router layer information may be obtained from one or more routers. For optical layer 150, the information may include location of optical equipment (e.g., transponder 181, regen 171, ROADM 157, or tails), errors from the optical equipment, availability of resources, length of optical paths, or outages of the optical equipment, among other things. The optical layer information may be obtained from one more ROADMs.

With continued reference to FIG. 2, based on multi-layer information of step 192 (e.g., optical layer and router layer information), there is a determination whether a change should be conducted on the optical layer or router layer, or on both layers. For example, in this scenario, the load along an optical path site 101-107-106-104 (i.e., path 11) may have reached a threshold (e.g., 80 percent) during a period (e.g., 30 minute time frame), which may cause errors or latency.

A first selected option may be for ROADMs along the path (e.g., ROADM 151, ROADM 157, ROADM 156, and ROADM 154) to add one more wavelengths carrying data channels to increase the capacity along path 11. This may be preferred over changing a routing path at routing layer 130, because there may be a tendency for the routing protocol to send traffic through router path site 105-104, which actually goes over optical path site 106-104 and doesn't help resolve the congestion. A second selected option (at a different time with different weighted info) may be for just the router layer 130 to be changed. Routes to some or all the traffic may be weighted to go through one or more routers (e.g., router 132) of site 102, because optical path site 102-103-109-104 does not go through optical path site 106-104. An additional consideration that may have led for this second selection option may be that the ROADMs could not or should not increase its wavelength based on the information as disclosed in step 191. A third selected option (at yet a different time with different weighted info) may decide to do a combination of router layer 130 and optical layer 150 solutions (e.g., configuration changes) in order to reduce the traffic to an acceptable threshold (e.g., 30 percent). SDN-MLC 112 may be used to determine the change needed in this step 192. As shown, SDN-MLC 112 may obtain data from different sources, such as tail database 114.

At step 193, SDN-MLC 112 may provide instructions based on the determination of step 192. For example, SDN-MLC 112 may communicate with routers, ROADMs, tails, ordering system 115, ROADM SDN controller 110, or the like to execute the determination of step 192. ROADM SDN controller 110 may be an intermediate device that may directly communicate with optical layer 150 devices. Ordering system 115 may be used to order one or more devices for future use (e.g., spare). There may be an anticipated need for the spare based on the information of step 191.

SDN-MLC 112 may manage the multiple layers of system 100 in a closed loop and heuristic manner. In a first example, this management may allow for dynamic mapping between a router layer and an optical layer by using colorless or directionless open ROADMs and reusing non-failed router layer or optical layer components of a failed link. In a second example, this management may allow for the use of spare tails (connection between a router port and optical transponder port) and spare optical regenerators. In a third example, this management by SDN-MLC 112 may allow router layer devices to be physical or virtual and software and hardware to be aggregated (e.g., traditional routers) or dis-aggregated (e.g., whitebox switches).

Based on the network condition (e.g., traffic matrix or outages) changes, the mapping between IP (e.g., router) and optical layers may be changed to more efficiently carry traffic under the changed network condition. Joint optimization of IP and optical layers whenever the network condition changes may be done by using algorithms based on integer linear programming or heuristics.

Figure 3:
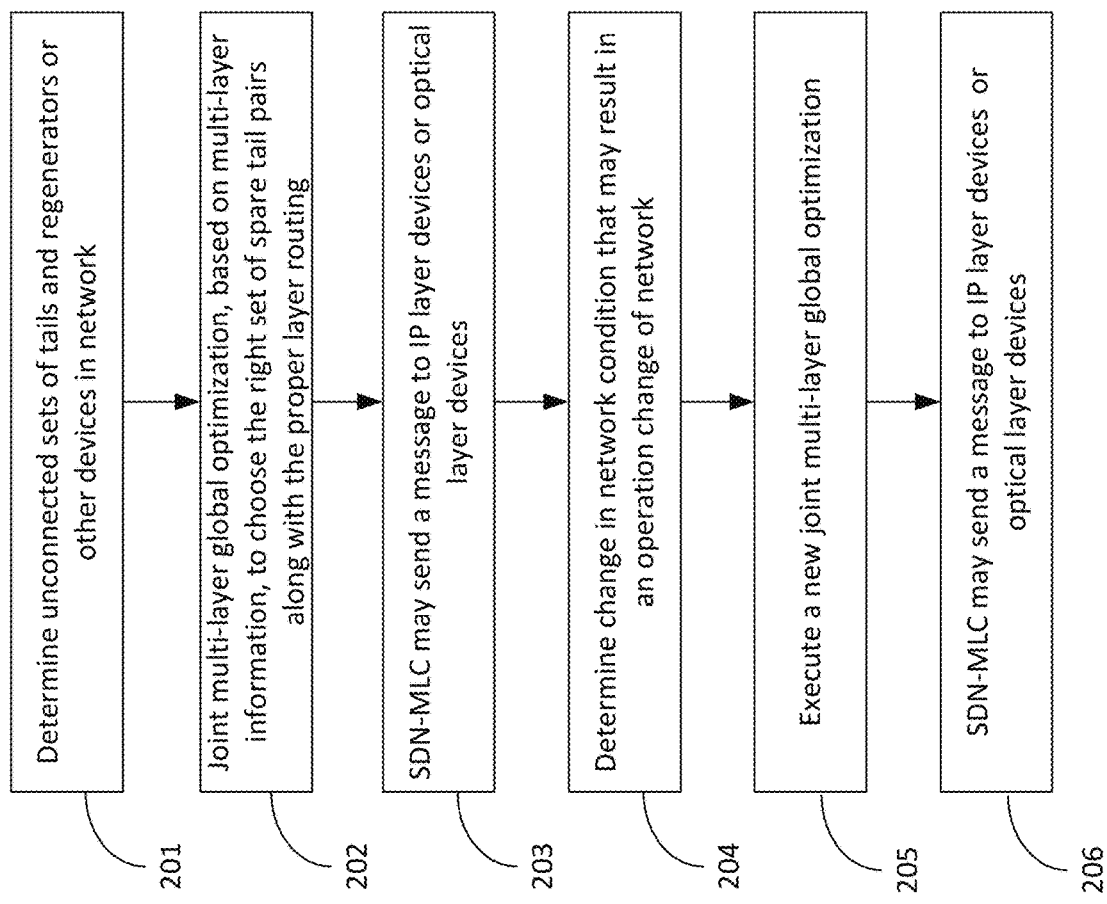
FIG. 3 illustrates an exemplary method for managing multi-layer system self-optimization.

FIG. 3 illustrates an exemplary method for managing multi-layer systems as disclosed herein. At step 201, initially system 100 may include unconnected sets of tails and regenerators. Each such tail and optical regenerator may be classified as spare tails and spare optical regenerators. The classification and the control of the devices (e.g., tail and optical regenerator) can be done automatically. For a given network condition, only a selected subset of spare tail pairs may be connected to form an IP link that carries the required traffic (e.g., less than 70 percent load) under the required latency constraints (e.g., 5 ms). Depending on the length (e.g., in miles) of a specific IP link, it may require spare optical regenerators as well. At step 202, a joint multi-layer global optimization may be done to choose the right set of spare tail pairs (plus optical regenerators, if needed) along with the proper IP layer routing. The joint optimization should satisfy engineering rule constraints (e.g., percentage of traffic of each type to be carried and latency constraints), use realizable routing (e.g., shortest path routing, constrained shortest path routing, multi-commodity flow routing with the restriction of equal splitting of traffic units, etc.), or optimize some other desirable quantities (e.g., maximizing unused spare tails and regenerators, minimizing the maximum traffic on a link, etc.). At step 203, SDN-MLC 112 may provide instructions for IP devices (e.g., physical or virtual routers) or optical layer devices to be turned up or down depending on network conditions of system 100.

With continued reference to FIG. 3, at step 204, there may be a detected change in network condition that may result in a change in the traffic matrix and a certain set of tails and regenerators to fail, or alternatively some previously failed tails and regenerators may become operational. At step 205, taking account of the traffic and failure conditions, a new joint multi-layer global optimization may be performed. The new joint multi-layer global optimization may result in some previously established IP links to be taken down and some new IP links to be added and thus also reflecting the dynamic nature and control of the network topology. The joint global optimization problem may be formulated as an exact integer linear programming problem, but if the exact algorithm is time consuming (e.g., hours) then a fast heuristic, which may take seconds or minutes, may be used. At step 206, SDN-MLC 112 may provide instructions for IP devices (e.g., physical or virtual) or optical layer devices to be turned up or down depending on network conditions of system 100. Software or hardware may remain aggregated or may be disaggregated.

Although a router layer, optical layer, and MPLS tunneling layer are discussed, it is contemplated that the MPLS tunneling layer be some other tunneling layer or not present at all. Also, it is contemplated that the optical layer may be another physical layer other than optical. As discussed herein, the router layer, may be a switching layer or the like. It is contemplated herein that the term information as considered herein may be information on any layer (e.g., layer 130 or layer 150). Activity patterns as disclosed herein may be considered "information" which is used in step 192. With reference to estimated time for repair, it is contemplated that sometimes it may take less time to implement a router layer solution rather than an optical layer solution (or vice versa). Although time may be a significant factor, SDN-MLC 112 may consider a predetermined weight of the information in order to derive a weighted determination (e.g., step 192 or step 202). The disclosed techniques may be used to help change the configuration of devices in different layers of the network so that near real-time optimization may meet the quality of service requirements of the network.

Figure 4:
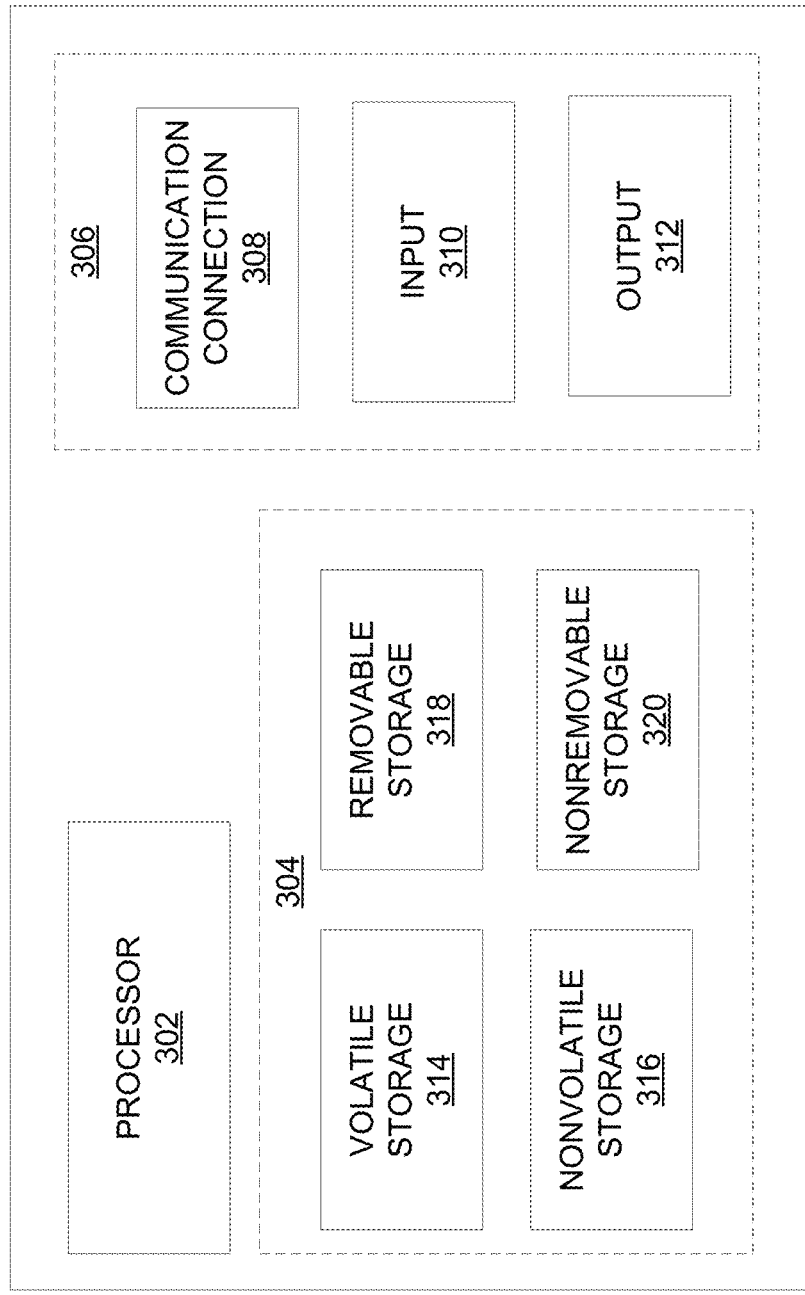
FIG. 4 illustrates a schematic of an exemplary network device.

FIG. 4 is a block diagram of network device 300 that may be connected to or comprise a component of system 100 of FIG. 1A. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card or wired communications (e.g., optical lines) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
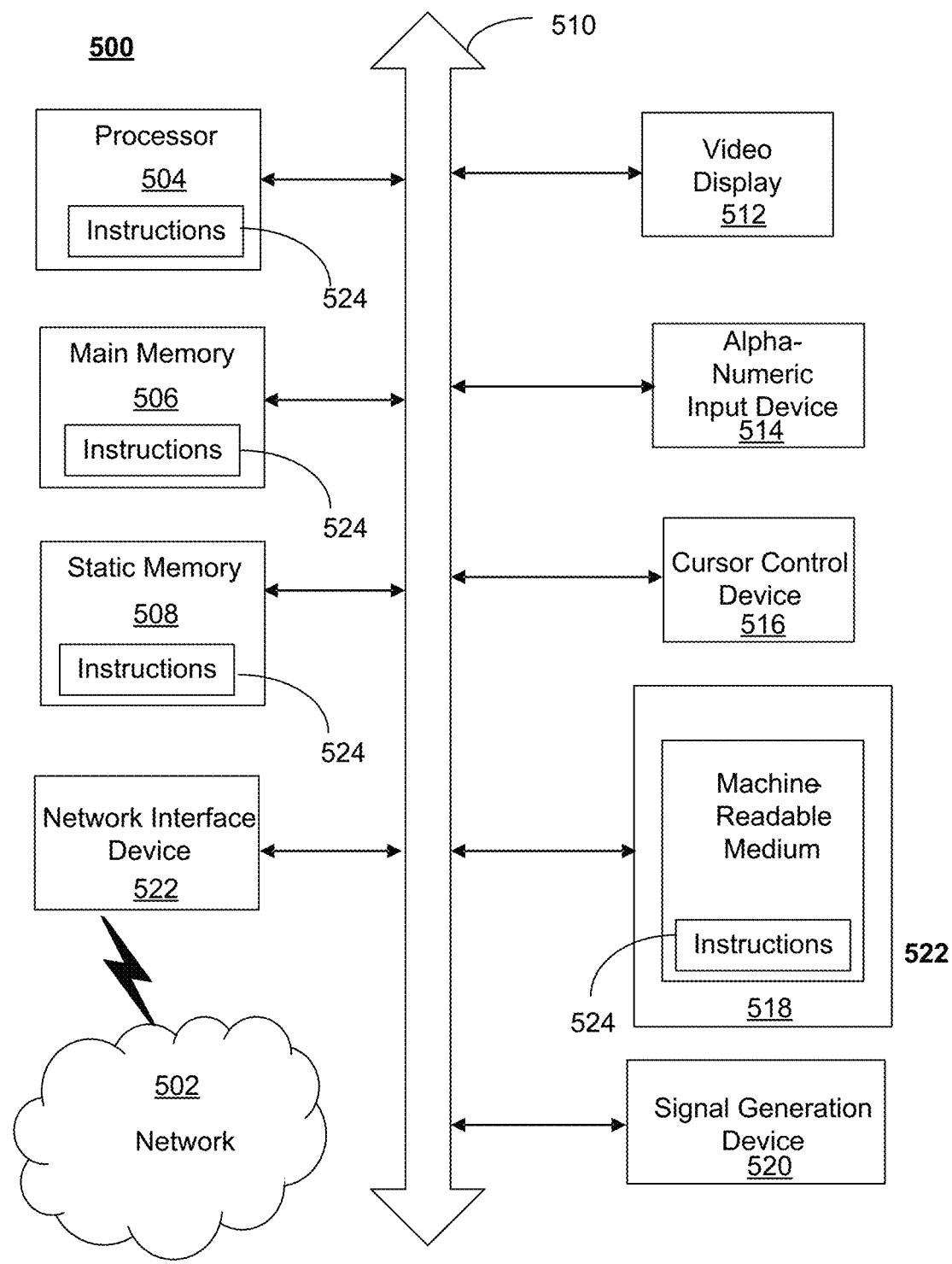
FIG. 5 illustrates an exemplary communication system that provides wireless telecommunication services over wireless communication networks.
Figure 6:
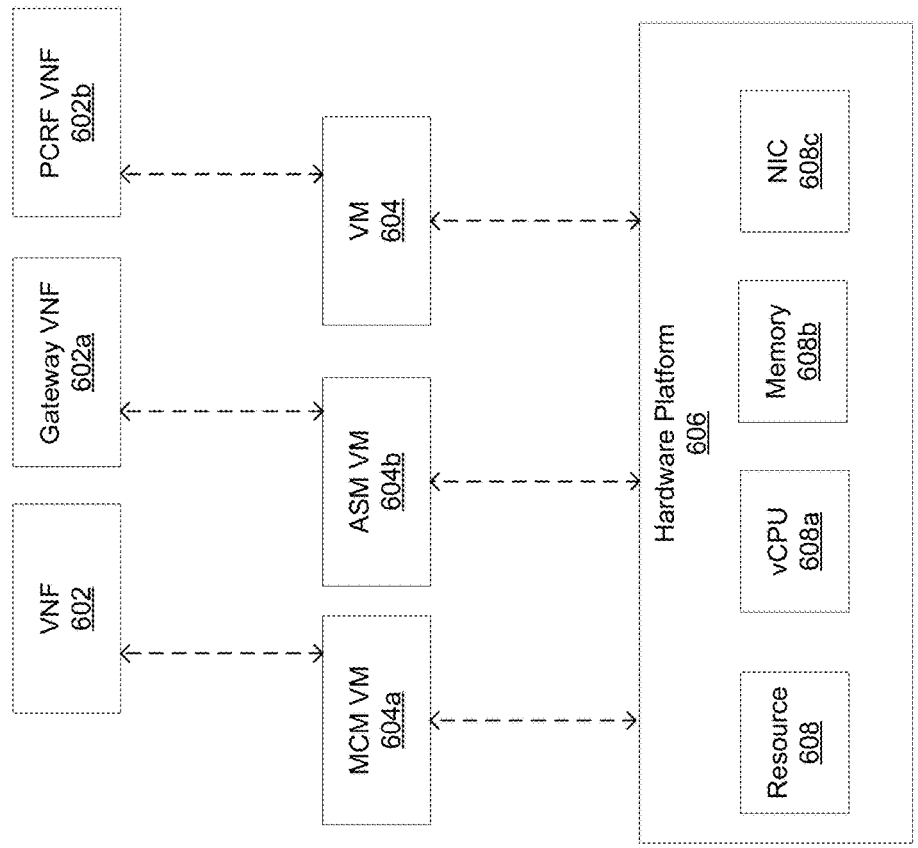
FIG. 6 is a representation of an exemplary network.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, router 131, and other devices of FIG. 1A, FIG. 1B, and FIG. 6. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

FIG. 6a is a representation of an exemplary network 600 (e.g., cloud). Network 600 (e.g., system 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 6a illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 6a illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

While FIG. 6a illustrates resources 608 as collectively contained in hardware platform 606, the configuration of hardware platform 606 may isolate, for example, certain memory 608c from other memory 608c.

As described herein, a telecommunications system wherein management and control utilizing a software defined network (SDN), at least in part, on user equipment, may provide a wireless management and control framework that enables common management and control, such as mobility management, radio resource management, QoS, load balancing, etc., across many technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

Crossing or meeting a threshold as discussed herein, which may trigger the determining step 192, may be described as surpassing a number that is prescribed in order to determine when some action is triggered. For example, a threshold may be crossed if the number of keepalives from a device is below a certain amount (e.g., 3) within a timeframe (e.g., 10 minutes) and therefore an alert may be triggered. In another example, a threshold may be crossed if the number of errors is above a certain amount (e.g., 100) within a certain time frame (e.g., 1 minute) and therefore an alert may be triggered. In another example, a link utilization on an IP link crossing a certain threshold may trigger the action of step 192.

While examples of a telecommunications system in which multi-layer self-optimization may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses (e.g., devices) of the subject matter of the present disclosure—multi-layer system self-optimization—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. Real-time as discussed herein refers to operations that usually occur in seconds, but not more than a minute. As disclosed herein, near real-time events usually occur within minutes. A traffic matrix may represent the load from each ingress point to each egress point in an IP network. Although networks are engineered to tolerate some variation in the traffic matrix, large changes may lead to congested links and poor performance. Configuration change of a component as disclosed herein may include a software change or a hardware change (e.g., replace or remove).

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
   a processor; and
   a memory coupled with the processor, the memory storing executable instructions that when executed by the processor cause the processor to effectuate operations comprising:
   obtaining multiple layer information associated with multiple layers of a telecommunications network, the multiple layer information comprising optical layer information and router layer information;
   based on the multiple layer information, anticipating a need of a component of the optical layer or the router layer; and
   based on the anticipating of the need of the component of the optical layer or the router layer,
   providing instructions to ordering system that comprise ordering one or more spares of the component.

2. The apparatus of claim 1, wherein the instructions are provided to a software-defined network controller for changing configurations for reconfigurable optical add-drop multiplexers (ROADMs).

3. The apparatus of claim 1, wherein the instructions further comprise implementing a configuration change of the router layer that comprises a configuration of a routing table.

4. The apparatus of claim 1, wherein the instructions further comprise implementing a configuration change of the optical layer that comprises a configuration of a tail.

5. The apparatus of claim 1, wherein the instructions further comprise implementing a configuration change of the optical layer comprises a configuration of an optical regenerator.

6. The apparatus of claim 1, wherein the instructions further comprise implementing a configuration change of the optical layer that comprises a configuration change of a reconfigurable optical add-drop multiplexer.

7. The apparatus of claim 1, wherein the instructions further comprise implementing a configuration change of the optical layer that comprises an addition of a wavelength channel of a reconfigurable optical add-drop multiplexer.

8. The apparatus of claim 1, wherein the optical layer information comprises an outage alarm.

9. The apparatus of claim 1, wherein the optical layer information comprises a load along an optical path.

10. A method comprising:
    obtaining, by a device, multiple layer information associated with multiple layers of a telecommunications network, the multiple layer information comprising optical layer information and router layer information;
    based on the multiple layer information, anticipating, by the device, a need of a component of the optical layer or the router layer; and
    based on the anticipating of the need of the component of the optical layer or the router layer,
        providing, by the device, instructions that comprise ordering one or more spares of the component.

11. The method of claim 10, wherein the instructions are provided to a software-defined network controller for changing configurations for reconfigurable optical add-drop multiplexers (ROADMs).

12. The method of claim 10, wherein the instructions further comprise implementing a configuration change of the router layer that comprises a configuration of a routing table.

13. The method of claim 10, wherein the instructions further comprise implementing a configuration change of the optical layer that comprises a configuration of a tail.

14. The method of claim 10, wherein the instructions further comprise implementing a configuration change of the optical layer comprises a configuration of an optical regenerator.

15. The method of claim 10, wherein the instructions further comprise implementing a configuration change of the optical layer that comprises a configuration change of a reconfigurable optical add-drop multiplexer.

16. The method of claim 10, wherein the instructions further comprise implementing a configuration change of the optical layer that comprises an addition of a wavelength channel of a reconfigurable optical add-drop multiplexer.

17. The method of claim 10, wherein the optical layer information comprises an outage alarm.

18. The method of claim 10, wherein the optical layer information comprises a load along an optical path.

19. A system comprising:
    a reconfigurable optical add-drop multiplexer;
    a router; and
    a software-defined multi-layer controller communicatively connected with the router and the reconfigurable optical add-drop multiplexer, the software-defined multi-layer controller comprising:
        a processor; and
        a memory coupled with the processor, the memory storing executable instructions that when executed by the processor cause the processor to effectuate operations comprising:
            obtaining multiple layer information associated with multiple layers of a telecommunications network, the multiple layer information comprising optical layer information;
            based on the multiple layer information, anticipating a need of a component of the optical layer or the router layer; and
            based on the anticipating of the need of the component of the optical layer or the router layer,
                providing instructions to ordering system that comprise ordering one or more spares of the component.

20. The system of claim 19, the operations further comprising
    determining a configuration change of the component based on an estimated time of repair, wherein the estimated time of repair is associated with repair of the optical layer or the router layer; and
    based on the determining the configuration change of the component based on the estimated time of repair, providing instructions to effectuate a change of configuration of the component.

* * * * *